United States Patent
Pedersen et al.

(10) Patent No.: US 9,409,718 B2
(45) Date of Patent: Aug. 9, 2016

(54) CONVEYOR BELT INCLUDING CHOCKING MODULE

(71) Applicant: Laitram, L.L.C., Harahan, LA (US)

(72) Inventors: Soren A. Pedersen, Summit, NJ (US); Miranda R. Kovach, Jefferson, LA (US); R. Scott Dailey, Destrehan, LA (US); John E. Wenzel, Mandeville, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/412,129

(22) PCT Filed: Jul. 10, 2013

(86) PCT No.: PCT/US2013/049842
§ 371 (c)(1),
(2) Date: Dec. 30, 2014

(87) PCT Pub. No.: WO2014/014716
PCT Pub. Date: Jan. 23, 2014

(65) Prior Publication Data
US 2015/0175359 A1    Jun. 25, 2015

Related U.S. Application Data

(60) Provisional application No. 61/673,036, filed on Jul. 18, 2012.

(51) Int. Cl.
*B65G 17/46*    (2006.01)
*B65G 15/42*    (2006.01)
*B65G 15/44*    (2006.01)
(Continued)

(52) U.S. Cl.
CPC .............. *B65G 17/46* (2013.01); *B65G 15/42* (2013.01); *B65G 15/44* (2013.01); *B65G 17/08* (2013.01); *B65G 47/66* (2013.01)

(58) Field of Classification Search
None
See application file for complete search history.

(56) References Cited

U.S. PATENT DOCUMENTS

| | | | |
|---|---|---|---|
| 4,171,045 A | 10/1979 | Lapeyre | |
| 4,832,183 A * | 5/1989 | Lapeyre | B65G 17/08 198/690.2 |
| 4,911,286 A | 3/1990 | Herzke | |

(Continued)

FOREIGN PATENT DOCUMENTS

| | | |
|---|---|---|
| EP | 1828031 A2 | 9/2007 |
| FR | 2415063 A1 | 8/1979 |

(Continued)

OTHER PUBLICATIONS

International Search Report and Written Opinion of the International Searching Authority, PCT/US2013/049842, mailed Oct. 4, 2013, Korean Intellectual Property Office, Republic of Korea.

(Continued)

*Primary Examiner* — Kavel Singh
(74) *Attorney, Agent, or Firm* — Catherine M. Bishop

(57) ABSTRACT

A conveyor belt comprising a plurality of modules hingedly connected together includes a first type of module including raised ribs arranged in columns and a second type of module including chock segments aligned with the columns. A transfer device includes fingers aligned with gaps between the chock segments and valleys between the columns. Each chock segment is substantially triangular in shape.

12 Claims, 5 Drawing Sheets

(51) Int. Cl.
*B65G 17/08* (2006.01)
*B65G 47/66* (2006.01)

(56) References Cited

U.S. PATENT DOCUMENTS

| | | |
|---|---|---|
| 6,371,280 B1 | 4/2002 | Lindner |
| 6,986,420 B2 | 1/2006 | Weiser et al. |
| 7,111,725 B2 | 9/2006 | Marshall et al. |
| 7,506,750 B2 | 3/2009 | Costanzo et al. |
| 7,641,044 B2 | 1/2010 | Ozaki et al. |
| D647,043 S | 10/2011 | Liao |
| 8,827,070 B2 * | 9/2014 | Kalverkamp ......... A01D 17/10 198/690.2 |
| 2003/0010608 A1 | 1/2003 | Jaynes |
| 2004/0178049 A1 | 9/2004 | Hertz et al. |
| 2006/0076218 A1 | 4/2006 | Marshall et al. |
| 2012/0043184 A1 | 2/2012 | Marshall et al. |

FOREIGN PATENT DOCUMENTS

| | | |
|---|---|---|
| JP | 2010-25015 A | 1/1998 |
| JP | 2010149981 A | 7/2010 |

OTHER PUBLICATIONS

Extended European Search Report of the European Patent Office, Application No. 13820577.8, mailed Apr. 1, 2016, European Patent Office, Munich, DE.

* cited by examiner

CONVEYOR BELT INCLUDING CHOCKING MODULE

BACKGROUND

The invention relates generally to power driven conveyor belts. More particularly, the present invention relates to industrial conveyor belts used to convey a car or other machine having wheels.

Conveyor belts may be used in assembly lines, car washes or other locations requiring conveyance of a car or other machine having wheels. Current car pusher conveyor belts have large openings at idle and drive ends that pose a safety hazard for people walking on the conveyor belts. In addition, the large openings create the risk of objects falling through the openings.

SUMMARY

The present invention provides a conveyor belt comprising a plurality of modules hingedly connected together. The conveyor belt includes a first type of module including raised ribs arranged in columns and a second type of module connected to the first type of module. The second type of module includes chock segments aligned with the columns of raised ribs. A transfer device includes fingers aligned with gaps between the chock segments and valleys between the columns. Each chock segment is substantially wedge shaped.

According to one aspect of the invention, a module for a conveyor belt comprises a deck extending in length from a first end to a second end and in width from a left side to a right side and having a top surface and an opposite bottom surface and a segmented chock extension extending from the top surface of the deck.

According to another aspect of the invention, a conveyor belt, comprises a first module comprising a first deck and an array of raised ribs arranged in a set of columns extending from a top surface of the first deck and a second module connected to the first module, the second module comprising a second deck and a segmented chock extension extending from a top side of the second deck. The segmented chock extension comprises a row of wedge-shaped chock segments, each chock segment aligned with a column of raised ribs.

According to another aspect of the invention, a conveyor comprises a conveyor belt having a first module and a second module connected to the first module, and a transfer platform. The first module has a first deck and an array of raised ribs arranged in a set of columns extending from a top surface of the first deck. The second module comprises a second deck and a segmented chock extension extending from a top surface of the second deck. The segmented chock extension comprises a row of wedge-shaped chock segments separated by gaps, each chock segment aligned with a column of raised ribs. The transfer platform includes fingers extending from a plate, each fingers aligned with a gap between two chock segments.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
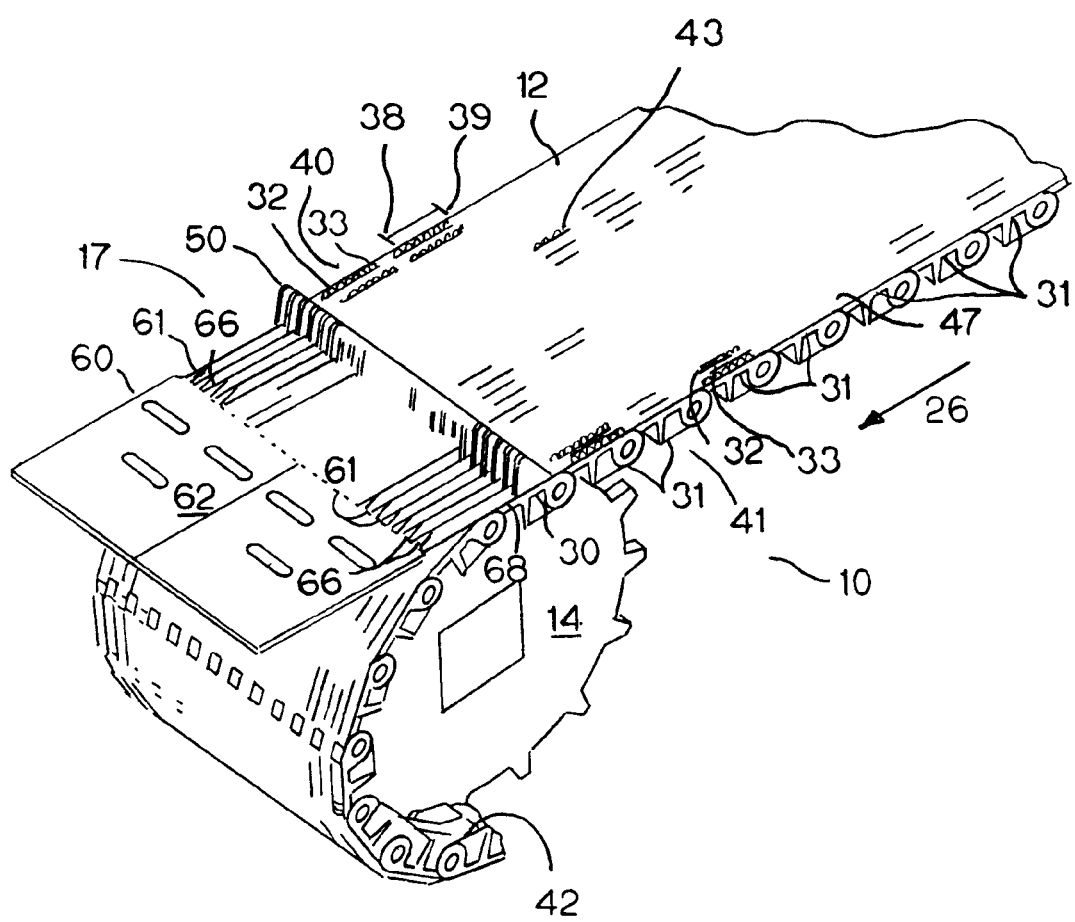
FIG. 1 illustrates an end portion of a conveyor belt including a chock module and a transfer device for transferring product off of the conveyor belt.
Figure 2:
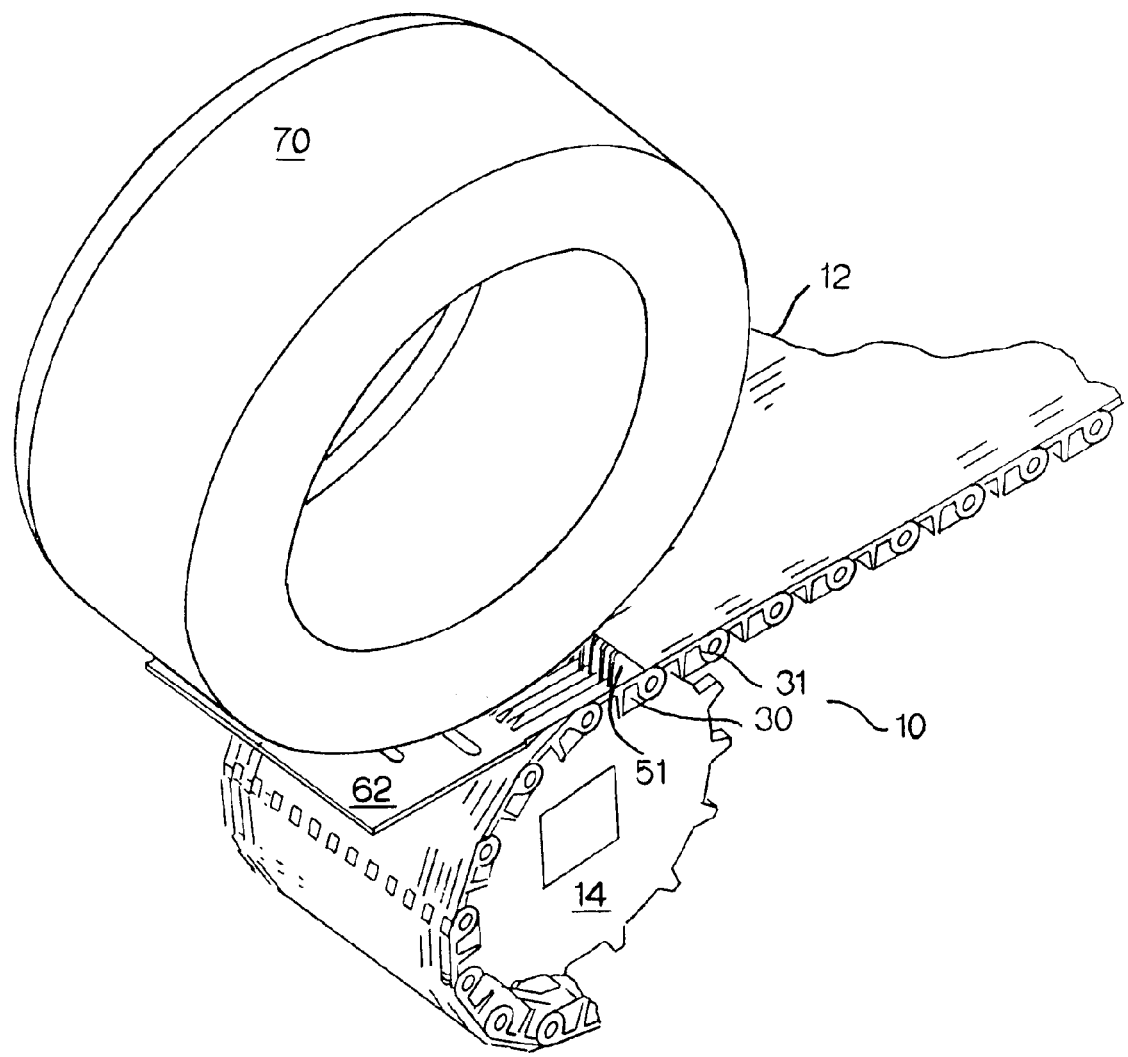
FIG. 2 illustrates the end portion of FIG. 1 illustrating the use of a chock module to position a wheel.

A portion of a conveyor embodying features of the invention is shown in FIGS. 1-2. The conveyor 10 includes a conveyor belt 12 in the form of a belt loop wrapped around a pair of sprocket sets 14, or drums, defining opposite ends of the conveyor. A motor drives the belt in a direction of belt travel 26.

The conveyor belt 12 is preferably a modular plastic conveyor belt, such as one of those manufactured and sold by Intralox, L.L.C., of Harahan, La., USA. The modular belt is constructed of a series of rows of one or more belt modules. The modules are conventionally molded out of a thermoplastic polymer, such as polyethylene, polypropylene, acetal, or a composite polymeric material.

Each row, which may comprise one or more modules, extends longitudinally from a first end 38 to a second end 39, laterally from a first side 40 to a second side 41, and in thickness from a bottom 42 to a top surface 43. The bottom surface 42 may include drive structure, such as teeth, for engaging the sprocket 14. The top surface 43 forms a conveying surface for carrying conveyed products. Consecutive rows are connected together at hinge joints 47 that enable the belt to articulate about sprockets. Instead of a modular hinged belt, a slat conveyor belt constructed of slat modules between flanking roller chains could be used. The belt follows a conveying circuit including along a carryway atop a carryway pan or other support structure and along an opposite returnway below the carryway. Along the carryway, the belt defines a generally planar carryway path for transporting articles from one end of the conveyor to the other.

The illustrative conveyor belt is a heavy duty industrial belt suitable for transporting cars or other heavy machines through an assembly line, car wash or other environment. The conveyor belt includes at least two types of modules. Each illustrative module includes a central deck extending from a leading end to a trailing end and from a first side to a second side and hinge elements spaced apart on the leading and trailing ends, though alternative embodiments are possible. A first type of module 31 in the conveyor 10 is a raised rib module. Most of the modules in the conveyor comprise raised rib modules. Each raised rib module 31 includes an array of raised ribs extending from the top conveying surface of the module. The raised ribs are arranged in columns 32 separated by valleys 33 to form a non-skid surface. An example of the non-skid modules 31 is described in U.S. Pat. No. 7,111,725, the contents of which are incorporated by reference. The invention is not limited to the shown rib configuration. At select intervals, the belt 12 includes a chock-type module 30 that includes chock extensions 50 for chocking a wheel 70, as shown in FIG. 2.

Figure 3:
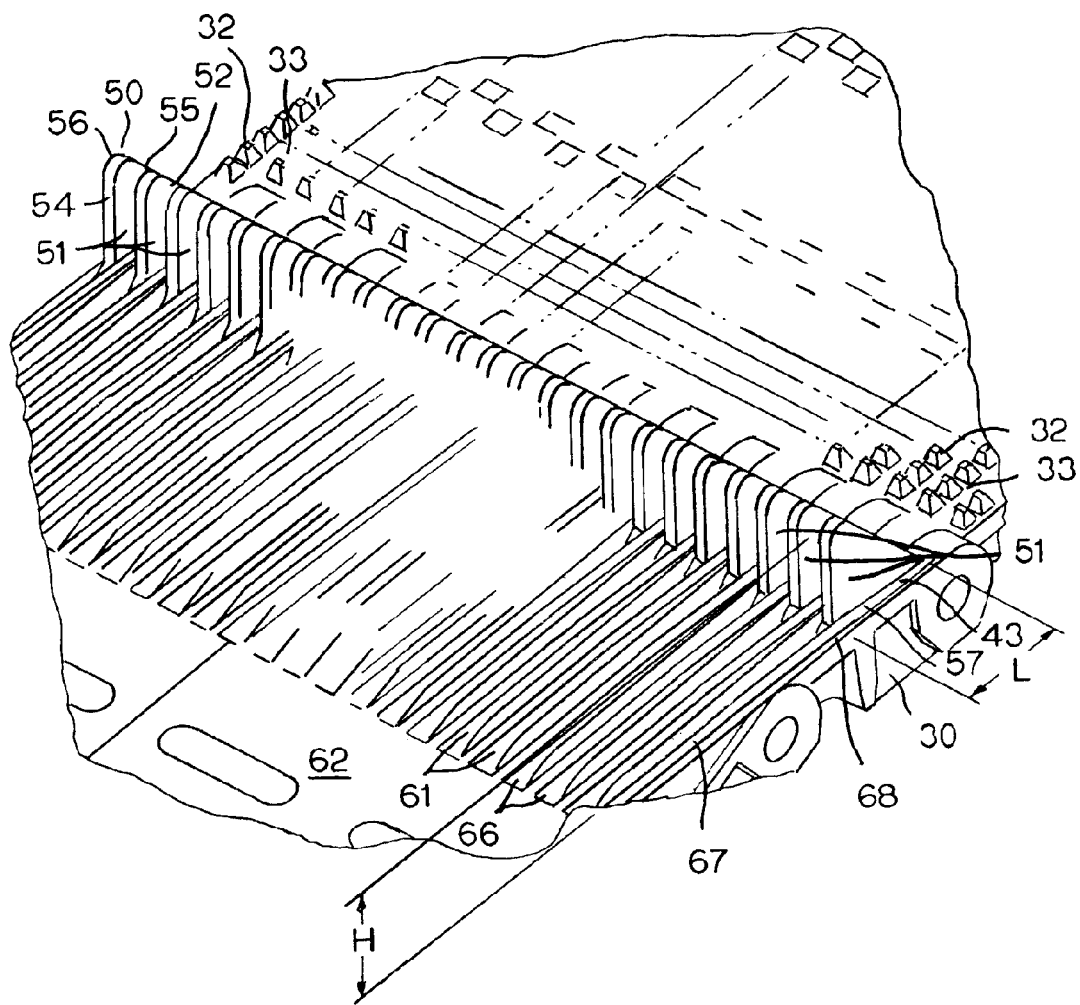
FIG. 3 is a detailed close up view of a chock module of the conveyor belt of FIG. 1.

Each chock extension 50, shown in detail in FIG. 3, comprises a plurality chock segments 51 extending from the top surface 43 of the module. The illustrative chock segments 51 are wedge-shaped, though the invention is not limited to a wedge or triangular shape. Gaps 52 separate the chock segments. The gaps 52 between the segments align with valleys 33 between the columns 32 of raised ribs and each segment 51 aligns with a column 32 of raised ribs. The illustrative gaps 52 extend to the top surface 43 of the module.

Although the chock segments 51 may have a variety of shapes, each illustrative chock segment has a generally triangular shape, including a substantially vertical (i.e., perpendicular to the top surface 43 of the module) front face 54, an angled back face 55 and a rounded tip 56. The base 57 of the segment may extend substantially from a first (leading) end of the module to a second (trailing) end of the module. The height of the segment H may be substantially equal to the length L of the segment at the base, and is sufficient to prevent a chocked wheel 70 from moving.

In one embodiment, the gaps 52 are between about 0.1 inches and about 0.375 inches in width and preferably about 0.125 inches in width. The chock segments 51 may be between about 1.0 and about 3.0 inches in height H, and are preferably between about 1.5 inches and about 2.0 inches in height. The center-to-center distance between adjacent gaps 52 in a chock extension is between about 0.25 inches and about 0.75 inches and preferably between about 0.375 and about 0.5 inches. The dimensions of the chock segments 51 and size of the gaps 52 between the chock segments preferably complies with the safety codes set forth for escalators, elevators and/or people movers, such as ASME A17.1, Safety Code for Elevators and Escalators, and CSA B44 Safety Coded for Elevators. The chock segments 51 are preferably unitarily molded with the modules from which they extend, so that the chock segments are integral with the deck of the module. In the examples shown, all the chock segments 51 are of the same height, but it would be possible for the chock segments to be of different heights, with the tallest one defining a maximum height.

Positioned at the exit end 17 of the conveyor 10 is a transfer device for offloading articles off the end of the conveyor. The device is a transfer platform 60 that includes fingers 61 extending outward from a plate 62. The fingers 61 are separated laterally by gaps 66 and extend to finger tips 68 close to the top surface 43 of the belt. Top finger surfaces 67 may be coplanar with a transfer plate top surface 63 so that articles transferred between the belt and the conveyor may transfer smoothly. Alternatively, the transfer plate surface 63 may be slightly offset from the top finger surfaces 67. The bottom finger surface 69 may be shaped to increase the strength of the fingers. For example, the fingers may taper in depth from the plate 62 towards the tips 68. The transfer platform 60 may be formed of steel or another suitable material.

The gaps 66 between the transfer device fingers 61 align with the chock segments 51 and columns of ridges 32 on the modules. The fingers 61 align with the gaps 52 between chock segments in modules 30 and valleys 33 of the modules 31.

Figure 4:
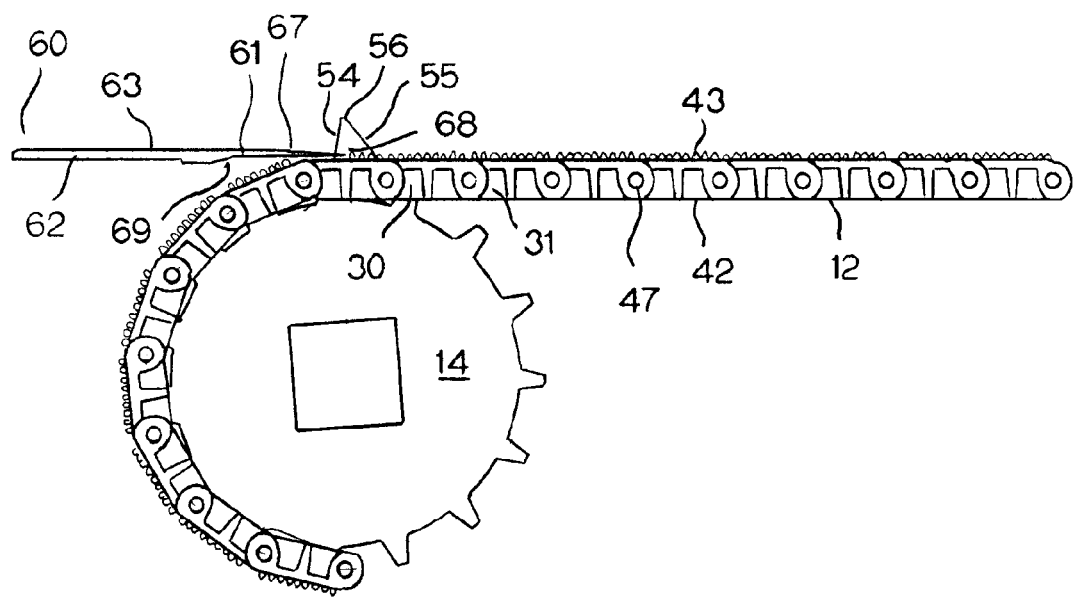
FIG. 4 is a side view of the end portion of FIG. 1 as the chock module nears the transfer device.
Figure 5:
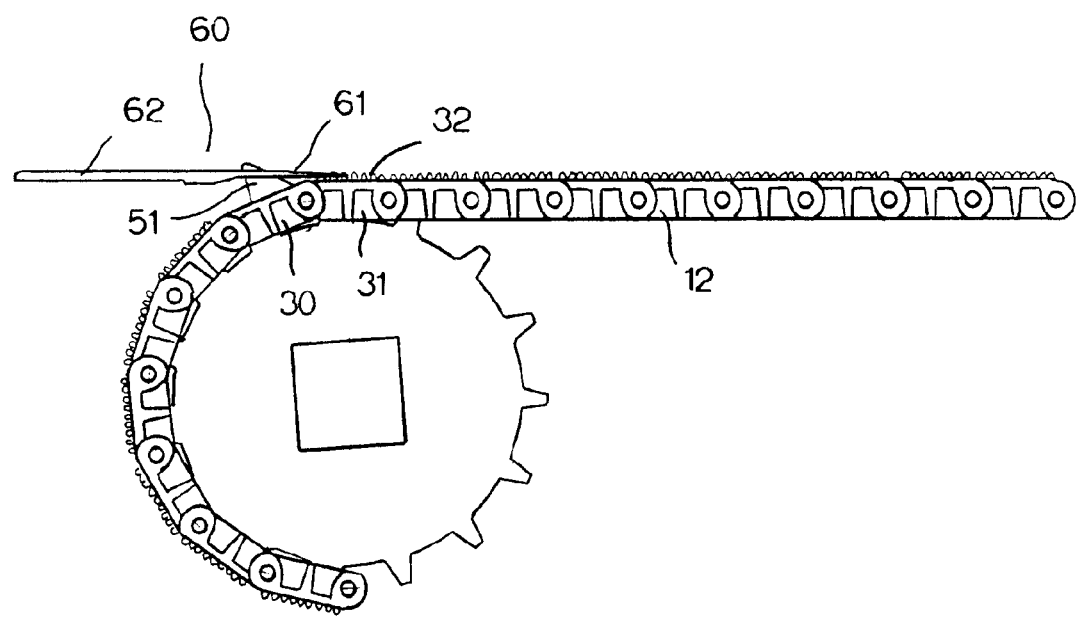
FIG. 5 is a side view of the end portion of FIG. 1 as the chock module passes through the transfer device.
Figure 6:
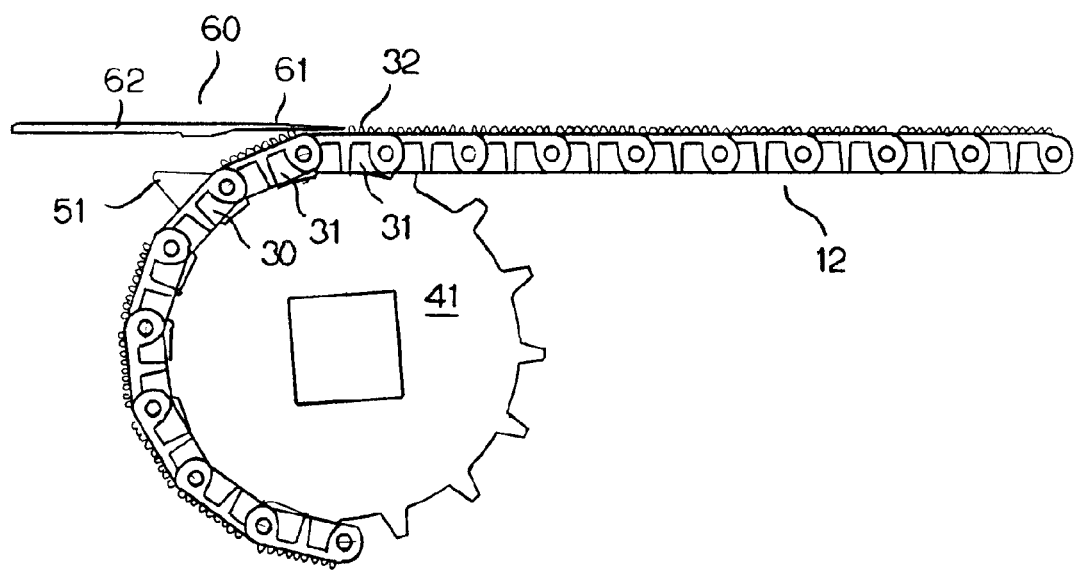
FIG. 6 is a side view of the end portion of FIG. 1 after the chock module passes through the transfer device.

The chock module will prevent a wheel 70 or other product placed on the module from rolling backwards as a vehicle is conveyed towards the discharge end 17 of the conveyor. As the chock module 30 approaches the transfer device, as shown in FIG. 4, the chock segments 51 push an object positioned on the chock module onto the transfer device 60. The chock segments 51 pass through the fingers 61. As the portion of the conveyor belt containing the chock module 30 wraps around the sprocket 14, as shown in FIG. 5, the chock segments 51 pass downwards through the fingers 61, allowing transfer of the wheel or other conveyed product off of the belt. The fingers 61 are sized and configured to prevent the chock segments from hitting the plate 62. As shown, the fingers are longer in length than the modules 30, 31. FIG. 6 shows the chock module 30 after it passes the transfer device 60. At this position, the fingers 61 of the transfer device extend through the valleys 32 of the ridged modules 30, with the columns of ridges passing through the gaps 66 between the fingers 61.

The segmented chock extension prevents large gaps in the transfer plate and combines with the non-skid raised rib modules to provide safety for people walking on the conveyor belt and to prevent objects from falling through the conveyor belt.

Although the invention has been described with reference to specific versions, other versions are possible. The scope of the invention is not meant to be limited to the exemplary versions described in detailed.

What is claimed is:

1. A module for a conveyor belt comprising:
   a deck extending in length from a first end to a second end and in width from a left side to a right side and having a top surface and an opposite bottom surface; and
   a segmented chock extension extending from the top surface of the deck, the segmented chock extension comprising a row of triangular-shaped chock segments, each chock segment comprising a vertical front face extending by a height above the top surface, an angled back face extending towards the second end of the deck and a rounded tip, each chock segment extending along the top surface by a base length equal to the height.

2. The module of claim 1, wherein the base of each chock segment extends in length from the first end of the deck to the second end of the deck.

3. The module of claim 1, wherein the chock segments are separated by gaps that are between about 0.1 inches and about 0.375 inches.

4. The module of claim 3, wherein a center-to-center distance between adjacent gaps is between about 0.25 inches and about 0.75 inches.

5. The module of claim 3, wherein the gaps extend to the top surface of the deck.

6. The module of claim 1, wherein the segmented chock extension is integrally formed with the deck.

7. A conveyor belt, comprising:
   a first module comprising a first deck and an array of raised ribs arranged in a set of columns extending from a top surface of the first deck, the columns of ribs separated by valleys; and
   a second module connected to the first module, the second module comprising a second deck and a segmented chock extension extending from a top side of the second deck, wherein the segmented chock extension comprises a row of wedge-shaped chock segments separated by gaps, each wedge-shaped chock segment having a vertical front face extending by a height above the top side and a base extending by a length along the top side that is equal to the height, wherein each chock segment is aligned with a column of raised ribs and the gaps are aligned with the valleys.

8. The conveyor belt of claim 7, wherein the wedge-shaped cock segments are separated by gaps that are between about 0.1 inches and about 0.375 inches.

9. A conveyor, comprising:
   a conveyor belt comprising
      a first module comprising a first deck and an array of raised ribs arranged in a set of columns extending from a top surface of the first deck, and
      a second module connected to the first module, the second module comprising a second deck and a segmented chock extension extending from a top surface of the second deck, wherein the segmented chock extension comprises a row of wedge-shaped chock segments separated by gaps, each chock segment aligned with a column of raised ribs; and a transfer platform including fingers extending from a plate, each finger aligned with a gap between two chock segments and a valley between two columns of raised ribs, wherein each finger is longer in length than each of the first module and the second module.

10. The conveyor of claim 9, wherein the columns in the first module are separated by valleys.

11. The conveyor of claim 10, wherein the fingers of the transfer platform and the gaps of the second module are aligned with the valleys of the first module.

12. The conveyor of claim 9, wherein the fingers taper in depth from the plate towards the tips of the fingers.

* * * * *